US011423433B2

(12) United States Patent
Hayasaka

(10) Patent No.: US 11,423,433 B2
(45) Date of Patent: Aug. 23, 2022

(54) PAYMENT SYSTEM, METHOD FOR PROVIDING INFORMATION, AND PROGRAM

(71) Applicant: Rakuten Group, Inc., Tokyo (JP)

(72) Inventor: Daigo Hayasaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/362,130

(22) Filed: Jun. 29, 2021

(65) Prior Publication Data

US 2022/0101369 A1 Mar. 31, 2022

(30) Foreign Application Priority Data

Sep. 29, 2020 (JP) .............................. JP2020-163666

(51) Int. Cl.
*G06Q 30/02* (2012.01)
*G06Q 20/32* (2012.01)

(52) U.S. Cl.
CPC ....... *G06Q 30/0236* (2013.01); *G06Q 20/322* (2013.01); *G06Q 30/0222* (2013.01)

(58) Field of Classification Search
CPC ............. G06Q 30/0236; G06Q 20/322; G06Q 30/0222
See application file for complete search history.

(56) References Cited

U.S. PATENT DOCUMENTS

| 10,832,299 | B1 * | 11/2020 | Clauss | ............... G06Q 30/0611 |
| 2002/0055884 | A1 | 5/2002 | Tokuma | |
| 2003/0120590 | A1 | 6/2003 | Ieshima et al. | |
| 2008/0117201 | A1 * | 5/2008 | Martinez | .............. G11B 27/322 345/418 |

(Continued)

FOREIGN PATENT DOCUMENTS

| JP | 2002-149946 A | 5/2002 |
| JP | 2003-187164 A | 7/2003 |
| JP | 2018-136724 A | 8/2018 |

OTHER PUBLICATIONS

"Survey: 99 percent of Consumers will share personal info for rewards, but want brands to ask permission" (Sterling, Greg; Published Jun. 2, 2015 at https://martech.org/survey-99-percent-of-consumers-will-share-personal-info-for-rewards-also-want-brands-to-ask-permission/) (Year: 2015).*

*Primary Examiner* — James M Detweiler
(74) *Attorney, Agent, or Firm* — Sughrue Mion, PLLC

(57) ABSTRACT

A payment system and method that changes a degree of disclosure of personal information provided for a store, including a settlement server that acquires a disclosure level of personal information when an electronic settlement from a user terminal to a store is detected, the disclosure level being set by a payer at present. A picker picks out a new disclosure level different from the acquired present disclosure level. A presenter presents first information about the present disclosure level and second information about the new disclosure level in a selectable manner at the user terminal. In accordance with a selection result in the user terminal, a provider provides the store with partial information extracted from the personal information according to the selected disclosure level. Then, an updater updates the disclosure level to the new disclosure level when the selection result is the second information.

8 Claims, 10 Drawing Sheets

(56) References Cited

U.S. PATENT DOCUMENTS

| | | | |
|---|---|---|---|
| 2014/0040134 A1* | 2/2014 | Ciurea | G06Q 20/383 |
| | | | 705/44 |
| 2014/0278991 A1* | 9/2014 | Sandoval | G06Q 30/0257 |
| | | | 705/14.55 |
| 2017/0083931 A1* | 3/2017 | Allinson | G06Q 30/0224 |
| 2018/0181981 A1* | 6/2018 | Ahuja | G06Q 20/3223 |
| 2018/0181996 A1* | 6/2018 | Matthews | G06Q 30/0269 |
| 2018/0262514 A1* | 9/2018 | Hall | H04W 12/084 |

* cited by examiner

FIG. 4

| | | 231b | 231c | 231d | 231e | 231f |
|---|---|---|---|---|---|---|
| 231a | | DATE | STORE ID | TYPE | SETTLEMENT AMOUNT | BALANCE | ... |
| USER ID | ABC-D123 | 2020/09/06 | XYZ-A999 | PRODUCT SALES | 1,097 | 4,567 | ... |
| | | 2020/09/06 | LMN-B101 | BUS, ETC. | 178 | 5,664 | ... |
| | | 2020/09/05 | VWX-Y777 | PRODUCT SALES | 2,394 | 5,842 | ... |
| | | 2020/09/05 | LMN-C102 | BUS, ETC. | 178 | 8,236 | ... |
| | | 2020/09/04 | GHI-J321 | PRODUCT SALES | 1,586 | 8,414 | ... |
| | | : | : | : | : | : | ... |

| USER ID | NAME | DATE OF BIRTH | GENDER | ADDRESS | ANNUAL INCOME | DISCLOSURE LEVEL | ... |
|---|---|---|---|---|---|---|---|
| ABC-D123 | TARO VV | 1995.01.01 | MALE | AA, BB WARD, TOKYO | VV MILLION YEN | HIGH LEVEL | ... |
| BCD-E234 | HANAKO WW | 1994.02.02 | FEMALE | CC, DD CITY, OSAKA | XX MILLION YEN | MID LEVEL | ... |
| CDE-F345 | JIRO XX | 1993.03.03 | MALE | UU, VV CITY, KYOTO | VV MILLION YEN | LOW LEVEL | ... |
| DEF-G456 | NATSUMI YY | 1992.04.04 | FEMALE | WW, XX CITY, KANAGAWA | YY MILLION YEN | LOW LEVEL | ... |
| EFG-567 | SABURO ZZ | 1991.05.05 | MALE | YY, ZZ CITY, HOKKAIDO | ZZ MILLION YEN | MID LEVEL | ... |
| : | : | : | : | : | : | : | : |

232a  232b  232c  232d  232e  232f  232g

232

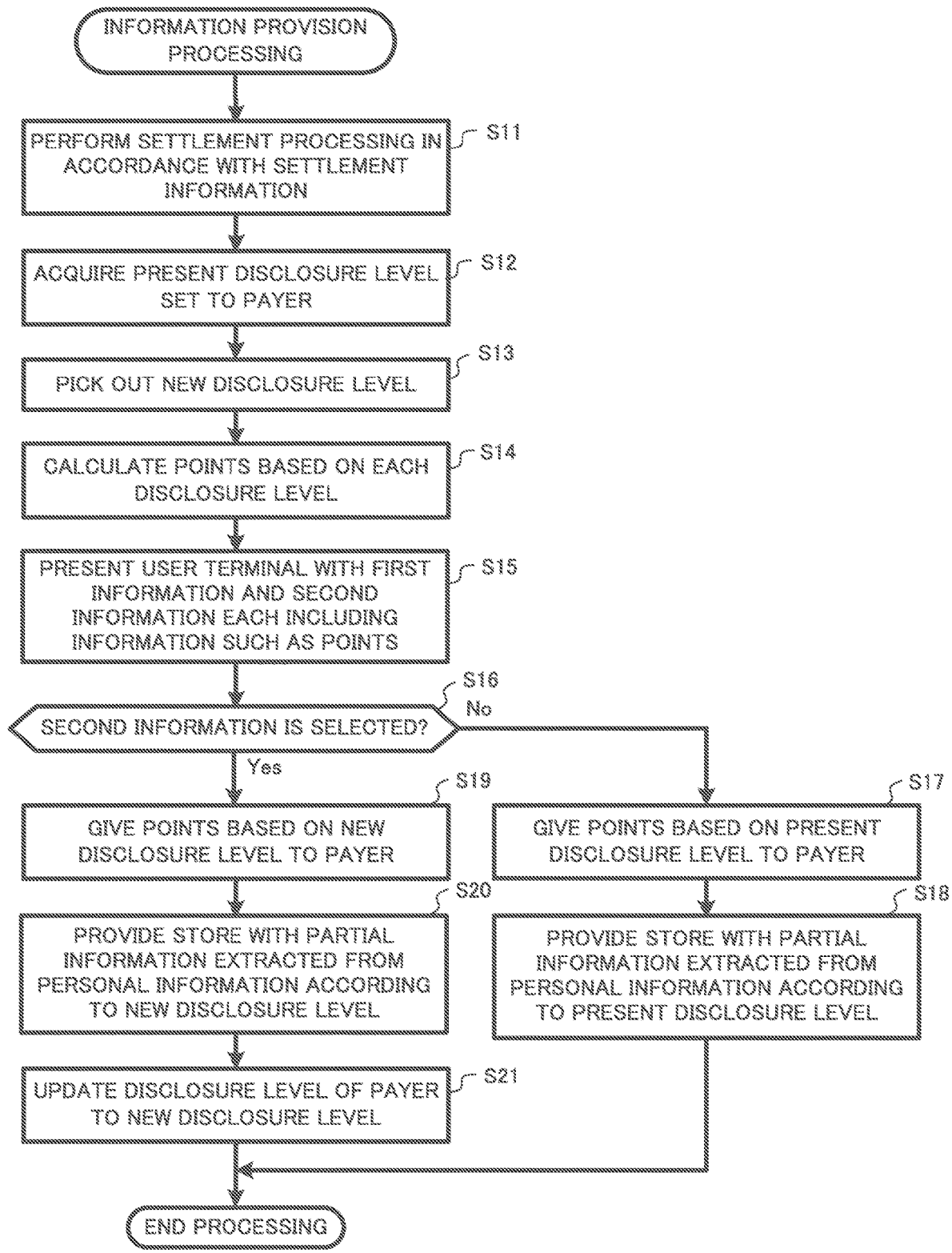

PAYMENT SYSTEM, METHOD FOR PROVIDING INFORMATION, AND PROGRAM

TECHNICAL FIELD

The present disclosure relates to a payment system, a method for providing information, and a program.

BACKGROUND ART

In recent years, a store selling articles or providing services issues a point card to a customer in order to promote continued use of the store (the same store or an affiliated store) by the customer. Then, by using the point card when making a payment at the store, the customer can acquire points based on the amount of payment and can also allot previously acquired points to the amount of payment.

As a prerequisite for a customer to use such a point card, for example, personal information about the customer such as an address, a name, gender, the date of birth, and a telephone number needs to be preregistered.

On the other hand, Patent Literature 1 discloses an invention of a member information management server presenting a bonus, such as points, given by registering personal information when a point card without registration of personal information is used and then prompting a customer (member) to register personal information by giving the bonus when the personal information is actually registered.

CITATION LIST

Patent Literature

Patent Literature 1: Unexamined Japanese Patent Application Publication No. 2018-136724

SUMMARY OF INVENTION

Technical Problem

Recently, a payment system utilizing a user terminal such as a smartphone held by a customer in place of a point card has been in practical use. For example, a payment application making an electronic settlement is installed on a user terminal, and when a customer (payer) makes a payment at a store by using the payment application, points are given.

With spread of such a payment application, the number of stores supporting payment by a payment application has sharply increased and thus customer convenience has increased; however, many customers have concern about personal information provided for a store when such an application is used.

Specifically, when a payment application is installed, a customer inputs detailed personal information required for electronic settlement, and the personal information is registered. Then, the present situation is that the personal information is equally provided for every store when a payment is made by using the payment application. For that reason, many customers are unwilling to provide personal information more than is necessary depending on a store to be used, an article to be purchased, or the like and intentionally do not use a payment application.

In such an actual situation, a technology allowing a degree of disclosure of personal information provided for a store to be freely changed on the customer side according to each store to be used or each payment has been sought.

The present disclosure has been made in view of the actual situation described above, and an objective of the present disclosure is to provide a payment system, a method for providing information, and a program that are able to freely change a degree of disclosure of personal information provided for a store.

Solution to Problem

A payment system according to a first aspect of the present disclosure is a payment system including:
a server detecting an electronic settlement from a payer to a store and a terminal used by the payer for the electronic settlement,
wherein the server includes:
an acquirer acquiring, when the electronic settlement is detected, a first level indicating a degree of disclosure of personal information, the degree of disclosure being set by the payer;
a picker picking out a second level different from the first level acquired by the acquirer;
a presenter presenting first information including information about the first level and second information including information about the second level in a selectable manner at the terminal;
a provider providing the store with partial information extracted from the personal information according to the first level or the second level, in accordance with a selection result in the terminal at which the first information and the second information are presented; and
an updater updating a degree of disclosure of the personal information to the second level when the selection result is the second information.

Further, in the payment system according to the aforementioned aspect, the picker may pick out the second level with a degree of disclosure higher than that of the first level or a degree of disclosure lower than that of the first level, based on information about the detected electronic settlement or a usage track record of the payer at the store.

Further, in the payment system according to the aforementioned aspect,
the server may further include a calculator calculating each of a first bonus to be given to the payer at the first level and a second bonus to be given to the payer at the second level, based on the first level, the second level, and information about the electronic settlement, and
the presenter may present the first information indicating information about the first level and the first bonus, and the second information indicating information about the second level and the second bonus in a selectable manner at the terminal.

Further, in the payment system according to the aforementioned aspect,
the server may further include a giver giving the first bonus or the second bonus to the payer in accordance with a selection result in the terminal at which the first information and the second information are presented.

Further, in the payment system according to the aforementioned aspect,
when a predetermined time elapses without any selection in the terminal at which the first information and the second information are presented,
the giver may give the first bonus to the payer, and
the provider may provide the store with partial information extracted from the personal information according to the first level.

Further, in the payment system according to the aforementioned aspect, the terminal may include:
- a receiver receiving the first information and the second information sent from the server in conjunction with the electronic settlement;
- a display displaying, in a selectable manner, the first information and the second information received by the receiver;
- an acceptor accepting selection of either of the first information and the second information displayed on the display; and
- a transmitter transmitting the selection result accepted by the acceptor to the server.

A method for providing information according to a second aspect of the present disclosure is a method for providing information executed by a server detecting an electronic settlement from a payer to a store, the method including:

acquiring, when the electronic settlement is detected, a first level indicating a degree of disclosure of personal information, the degree of disclosure being set by the payer;

picking out a second level different from the acquired first level;

presenting first information including information about the first level and second information including information about the second level in a selectable manner at a terminal used by the payer for the electronic settlement;

providing the store with partial information extracted from the personal information according to the first level or the second level, in accordance with a selection result in the terminal at which the first information and the second information are presented; and updating a degree of disclosure of the personal information to the second level when the selection result is the second information.

A program according to a third aspect of the present disclosure causes a computer detecting an electronic settlement from a payer to a store to function as:

an acquirer acquiring, when the electronic settlement is detected, a first level indicating a degree of disclosure of personal information, the degree of disclosure being set by the payer;

a picker picking out a second level different from the first level acquired by the acquirer;

a presenter presenting first information including information about the first level and second information including information about the second level in a selectable manner at a terminal used by the payer for the electronic settlement;

a provider providing the store with partial information extracted from the personal information according to the first level or the second level, in accordance with a selection result in the terminal at which the first information and the second information are presented; and an updater updating a degree of disclosure of the personal information to the second level when the selection result is the second information.

The aforementioned program may be distributed or sold through a computer communication network independently of a computer executing the program.

Furthermore, an information recording medium recording the aforementioned program is a non-transitory recording medium and may be distributed or sold independently of the computer. The non-transitory recording medium herein refers to a tangible recording medium. Examples of the non-transitory recording medium include a compact disk, a flexible disk, a hard disk, a magneto-optical disk, a digital video disk, a magnetic tape, and a semiconductor memory. Further, a transitory recording medium refers to a transmission medium (propagation signal) itself. Examples of the transitory recording medium include an electric signal, an optical signal, and an electromagnetic wave. A temporary storage area is an area for temporarily storing data and a program and is, for example, a volatile memory such as a random access memory (RAM).

Advantageous Effects of Invention

The present disclosure enables a degree of disclosure of personal information provided for a store to be freely changed.

BRIEF DESCRIPTION OF DRAWINGS

FIG. 4 is a schematic diagram illustrating an example of settlement management information;

FIG. 5 is a schematic diagram illustrating an example of personal information;

FIG. 9 is a flowchart for illustrating information provision processing according to the present embodiment.

DESCRIPTION OF EMBODIMENTS

An embodiment of the present disclosure will be described below. While a case that a degree of disclosure of personal information can be changed when a payment is made at a real store in the embodiment of the present disclosure, the case is an example, and, as will be described later, a degree of disclosure of personal information may be changed when a payment is made at a virtual store on the Internet.

In other words, the following embodiment is for explanatory purposes and does not restrict the scope of the present disclosure. Accordingly, while those skilled in the art may adopt embodiments obtained by replacing each or all of the components of the embodiment with equivalents thereof, such embodiments are also included in the scope of the present disclosure.

Overall Configuration

Figure 1:
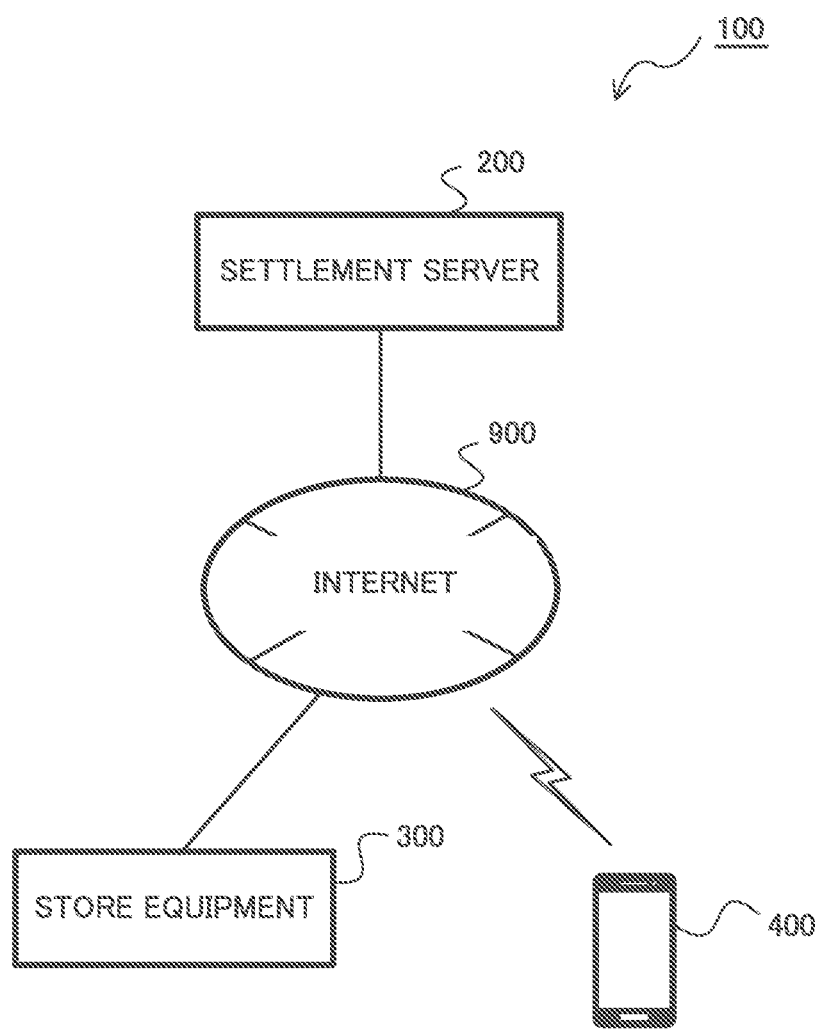
FIG. 1 is a block diagram illustrating an example of an overall configuration of a payment system according to the present embodiment.

As illustrated in FIG. 1, a payment system 100 according to the embodiment of the present disclosure is configured by communicably connecting, via the Internet 900, a settlement server 200, store equipment 300 installed at a store in a town, and a user terminal 400 carried by a user. While being simplified in the diagram, it is assumed that many pieces of store equipment 300 exist according to the number of stores supporting the system and many user terminals 400 exist according to the number of users using the system.

For example, the settlement server 200 is a computer for a server and, when a payment at a store (a store installed with store equipment 300) is made by a payment application executed on a user terminal 400, transmits information for checking and changing a degree of disclosure of personal information (presentation information to be described later) to the user terminal 400.

The store equipment 300 is a point of sales system (POS) register supporting the system or the like and, for example, includes a reader-writer conforming to the FeliCa (registered trademark) standard and a communication unit for communicating with the settlement server 200.

For example, when making an electronic settlement of a price of a commodity, the store equipment 300 reads and writes required information from an IC chip built into the user terminal 400 and transmits settlement information to the settlement server 200.

The method of electronic settlement is not limited to such a settlement method using an IC chip and may otherwise be a settlement method using a two-dimensional code typified by a QR code (registered trademark) (so-called code settlement).

Furthermore, the method of electronic settlement may be settlement by a server-type electronic money, payment by points, giving points, or the like.

For example, the user terminal 400 is a smartphone with a built-in IC chip or the like conforming to the FeliCa (registered trademark) standard and is installed with a payment application. The payment application controls a payment of a price using the IC chip and accepts a change related to a degree of disclosure of personal information.

When a two-dimensional code is used in electronic settlement, for example, the payment application generates a two-dimensional code to be read by a scanner in the store equipment 300 and displays the code on a screen, controls a payment of a price by reading a two-dimensional code installed at a store, and accepts a change related to a degree of disclosure of personal information.

Configuration Outline of Information Processing Device

A typical information processing device 500 providing the settlement server 200 and the user terminal 400 according to the embodiment of the present disclosure will be described.

Figure 2:
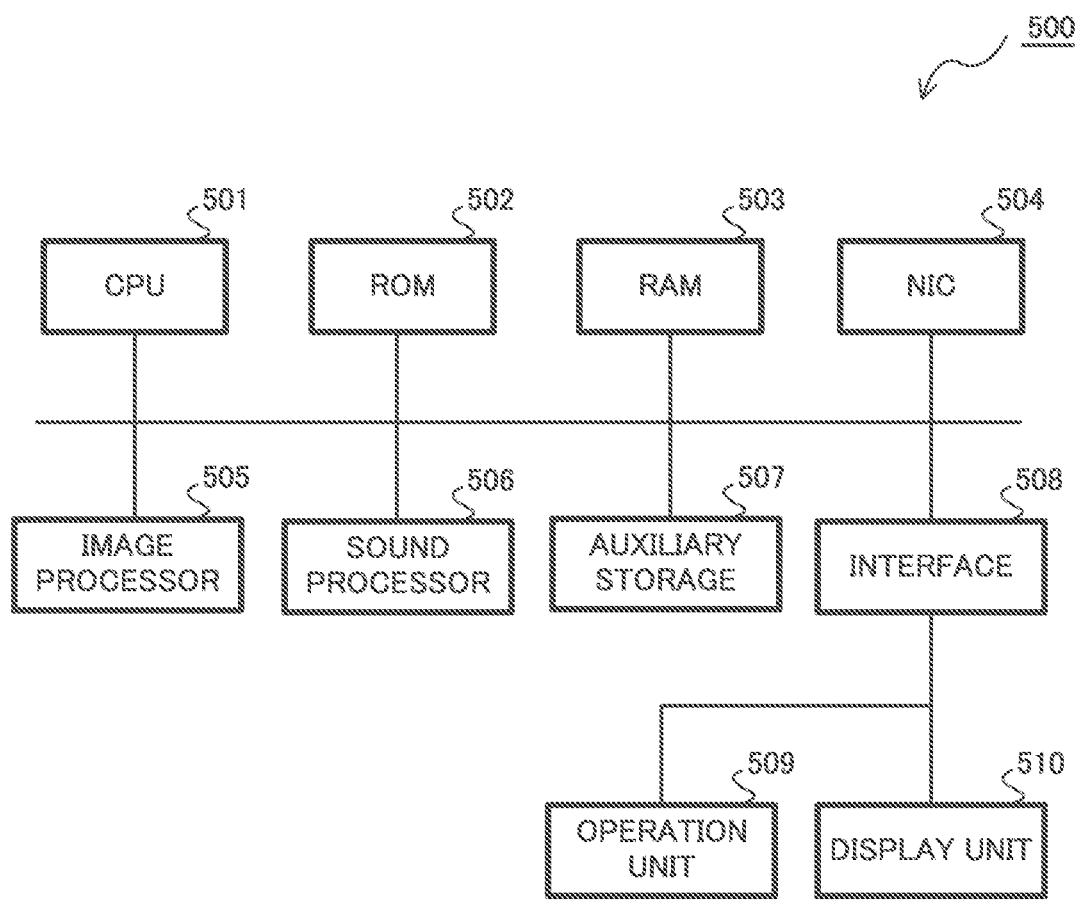
FIG. 2 is a block diagram illustrating an example of a configuration outline of a typical information processing device providing a settlement server and a user terminal.

As illustrated in FIG. 2, the information processing device 500 includes a central processing unit (CPU) 501, a read only memory (ROM) 502, a random access memory (RAM) 503, a network interface card (NIC) 504, an image processor 505, a sound processor 506, an auxiliary storage 507, an interface 508, an operation unit 509, and a display unit 510.

The CPU 501 controls entire operation of the information processing device 500, is connected to each component, and exchanges a control signal and data with the component.

An initial program loader (IPL) executed immediately after power-on is recorded in the ROM 502, and by the IPL being executed, a program stored in the auxiliary storage 507 is read into the RAM 503, and execution of the program by the CPU 501 is started.

The RAM 503 is for temporarily storing data and a program and keeps a program and data read from the auxiliary storage 507 and, in addition, data required for communication.

The NIC 504 is for connecting the information processing device 500 to a computer communication network such as the Internet and may be configured with an interface conforming to the 10BASE-T/100BASE-T standard used at configuration of a local area network (LAN), an analog modem for connecting to the Internet by using a telephone line, an integrated services digital network (ISDN) modem, an asymmetric digital subscriber line (ADSL) modem, a cable modem for connecting to the Internet by using a cable television line, or the like.

The image processor 505 processes image data read from the auxiliary storage 507 or the like with an arithmetic image processor (unillustrated) included in the CPU 501 or the image processor 505 and then records the processed data into a frame memory (unillustrated) included in the image processor 505. The image information recorded in the frame memory is converted into a video signal at a predetermined synchronization timing and then is output to the outside through the interface 508 or the like. When the information processing device 500 includes a display device, the image processor 505 outputs the converted video signal to the display device. Specifically, under control of the CPU 501, the image processor 505 generates an image required during the progress of processing performed by the information processing device 500 and causes an internal or external display device to display the image.

The sound processor 506 converts music data or voice data read from the auxiliary storage 507 or the like into a sound signal and outputs the signal to the outside through the interface 508 or the like. When the information processing device 500 includes a speaker, the sound processor 506 outputs the converted sound signal to the speaker. Specifically, under control of the CPU 501, the sound processor 506 generates a music sound or a voice to be generated during the progress of processing performed by the information processing device 500 and causes the music sound or the like to be output from an internal or external speaker.

The auxiliary storage 507 is a hard disk, a solid state drive (SSD), or the like and stores various programs and various types of data required for operation control of the entire information processing device 500. For example, the auxiliary storage 507 stores a program for providing the settlement server 200 according to the embodiment. Then, through control by the CPU 501, the auxiliary storage 507 appropriately reads the stored program and data and causes the RAM 503 or the like to temporarily store the program and the data. Further, for example, the auxiliary storage 507 may include an IC chip conforming to the FeliCa (registered trademark) standard.

For example, the interface 508 conforms to a standard such as HDMI (registered trademark) or the universal serial bus (USB) and is connected to the operation unit 509 and the display unit 510. In addition, the interface 508 may transmit and receive required information to and from connected external equipment.

The operation unit 509 accepts an operational input by an operator or the like using the information processing device 500.

The display unit 510 draws an image based on image data output by the image processor 505 and presents the image to an operator or the like using the information processing device 500.

In addition, the information processing device 500 may include a drive unit for a digital versatile disc (DVD)-ROM or the like in place of the auxiliary storage 507. In this case, the information processing device 500 reads a program and data from a DVD-ROM or the like mounted on the drive unit and operates similarly to the above.

A functional configuration and the like of the settlement server 200 provided by the aforementioned information processing device 500 will be described below with reference to FIG. 3 to FIG. 5. When power to the information processing device 500 is turned on and, for example, communication with the user terminal 400 and the like is enabled, a program for causing the information processing device 500 to function as the settlement server 200 according to the present embodiment is executed, and the settlement server 200 according to the present embodiment is provided.

As will be described later, the user terminal 400 is similarly provided by the information processing device 500.

Functional Configuration of Settlement Server 200

Figure 3:
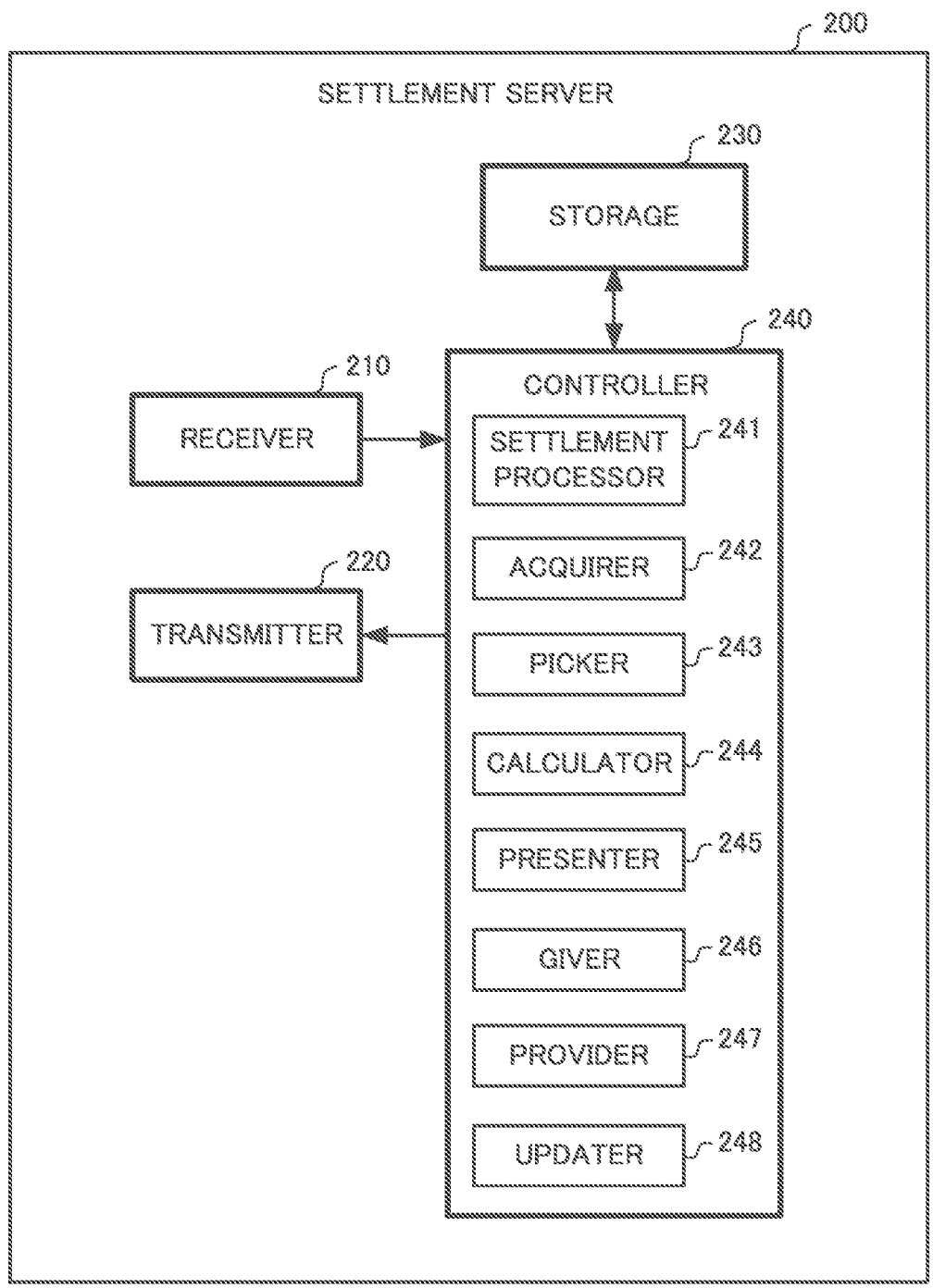
FIG. 3 is a block diagram illustrating an example of a functional configuration of the settlement server according to the present embodiment.

FIG. 3 is a block diagram illustrating an example of a functional configuration of the settlement server 200 according to the present embodiment. As illustrated, the settlement server 200 includes a receiver 210, a transmitter 220, a storage 230, and a controller 240.

The receiver 210 receives information sent from the store equipment 300 and the user terminal 400 via the Internet 900.

For example, when a payment by the payment application is made by a user terminal 400 at a store, the receiver 210 receives settlement information sent from the store equipment 300. Further, the receiver 210 receives selection information (selection information for selecting a degree of disclosure of personal information) sent from a user terminal 400 receiving presentation information to be described later.

The aforementioned NIC 504 may function as such a receiver 210.

The transmitter 220 transmits information directed to the user terminal 400 and the like via the Internet 900.

For example, the transmitter 220 transmits presentation information generated by the controller 240 (presenter 245) to be described later to the user terminal 400. Further, the transmitter 220 transmits partial information extracted by the controller 240 (provider 247) from personal information according to a degree of disclosure to a store (store equipment 300, or a server or the like managing the store equipment 300).

The aforementioned NIC 504 may function as such a transmitter 220.

The storage 230 stores settlement management information for managing electronic settlement by the payment application and personal information about a user using the payment application.

For example, the storage 230 stores settlement management information 231 as illustrated in FIG. 4.

As an example, the settlement management information 231 includes a user ID 231*a*, a date 231*b*, a store ID 231*c*, a type 231*d*, a settlement amount 231*e*, and a balance 231*f*, as illustrated in FIG. 4.

The date 231*b* is a date when an electronic settlement is made. Further, the store ID 231*c* is identification information acquired from store equipment 300 making an electronic settlement. Further, the type 231*d* is a type of a settlement target. Then, the balance 231*f* is a balance of an electronic value held by a user (as an example, managed by an IC chip). In a case of point payment, the balance 231*f* is a balance of points held by a user. Further, in a case of two-dimensional code settlement, credit information or the like preregistered (or used for the settlement) by a user is stored in the balance 231*f*.

Further, for example, the storage 230 stores personal information 232 as illustrated in FIG. 5.

As an example, the personal information 232 includes a user ID 232*a*, a name 232*b*, a date of birth 232*c*, gender 232*d*, an address 232*e*, an annual income 232*f*, and a disclosure level 232*g*, as illustrated in FIG. 5.

The disclosure level 232*g* defines a degree of disclosure when such personal information is provided for a store and can be freely changed by a user. Further, while three steps of levels (three levels) including a "high level," a "mid level," and a "low level" are indicated as an example of the disclosure level 232*g*, other steps of levels may apply.

In addition, the storage 230 stores terminal management information including unique identification information and a mail address of the user terminal 400. Further, the terminal management information may be included in the personal information 232 and be managed inclusively.

The aforementioned auxiliary storage 507 or the like may function as such a storage 230.

Returning to FIG. 3, the controller 240 controls the entire settlement server 200.

For example, the controller 240 includes a settlement processor 241, an acquirer 242, a picker 243, a calculator 244, a presenter 245, a giver 246, a provider 247, and an updater 248.

The settlement processor 241 updates an electronic value and the like held by a user in accordance with settlement information sent from store equipment 300 on electronic settlement. For example, the settlement processor 241 performs settlement processing based on a payment by a user (payer) by appropriately updating the settlement management information 231 stored in the aforementioned storage 230.

When an electronic settlement from a user to a store is detected, the acquirer 242 acquires a degree of disclosure of personal information, the degree of disclosure being set by the user (payer) at present. For example, the acquirer 242 refers to the personal information 232 stored in the aforementioned storage 230 and acquires the disclosure level 232*g* of the payer.

The picker 243 picks out a new disclosure level (second level) different from the present disclosure level (first level) acquired by the aforementioned acquirer 242. For example, based on information about a detected electronic settlement or a usage track record of a payer at a store (a store where the electronic settlement is made or an affiliated store), the picker 243 picks out a new disclosure level with a degree of disclosure higher than that of the present disclosure level or a degree of disclosure lower than that of the present disclosure level.

As an example, the picker 243 picks out a disclosure level with a degree of disclosure higher than that of the present disclosure level for a store (the same store or an affiliated store) having a past settlement track record of a certain frequency or more, or a certain amount or more. On the other hand, the picker 243 picks out a disclosure level with a degree of disclosure lower than that of the present disclosure level for a store (including a store used for the first time) having a past settlement track record of less than the certain frequency or less than the certain amount. In addition, the picker 243 may pick out a new disclosure level according to a settlement amount this time, a commodity being a settlement target, or the like. For example, the picker 243 picks out a disclosure level with a degree of disclosure higher than that of the present disclosure level when a settlement amount is a certain amount or more. On the other hand, the picker 243 picks out a disclosure level with a degree of disclosure lower than the present disclosure level when the settlement amount is less than the certain amount.

Further, the picker 243 may pick out a plurality of (for example, two) new disclosure levels different from the present disclosure level. In other words, as will be described later, when presentation information is presented on a user terminal 400, a user may pick out any of three disclosure levels in total.

Based on the present disclosure level (first level), a new disclosure level (second level), and information about a detected electronic settlement, the calculator 244 calculates points (a first bonus) to be given at the present disclosure level and points (a second bonus) to be given at the new disclosure level.

As an example, the calculator 244 calculates points equivalent to 1% of the settlement amount (omitting fractions) when a disclosure level is the "low level." Further, the calculator 244 calculates points equivalent to 2% of the settlement amount (omitting fractions) when the disclosure level is the "mid level." Further, the calculator 244 calculates points equivalent to 3% of the settlement amount (omitting fractions) when the disclosure level is the "high level."

The points thus calculated by the calculator 244 are an example of a bonus and another bonus may apply. For example, the calculator 244 may calculate a bonus such as a discount rate.

The presenter 245 presents first information indicating the present disclosure level (first level) and information about points to be given at the present disclosure level (a first bonus), and second information indicating a new disclosure level (second level) and information about points to be given at the new disclosure level (a second bonus) in a selectable manner on the user terminal 400.

Figure 6A:
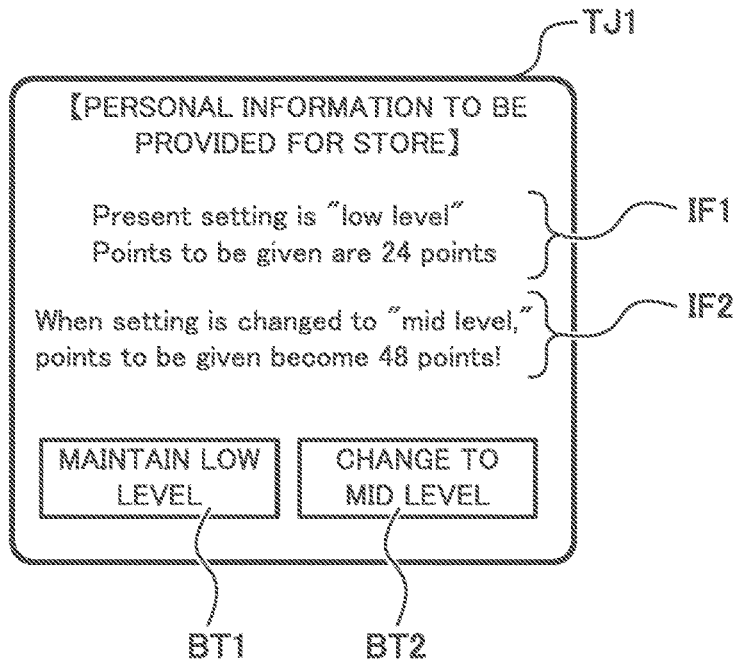
FIG. 6A and FIG. 6B are schematic diagrams illustrating an example of generated presentation information.

For example, the presenter 245 generates presentation information TJ1 as illustrated in FIG. 6A and presents the information on the user terminal 400. Specifically, the presenter 245 generates the presentation information TJ1 including first information IF1 indicating the present disclosure level and information about points given at the disclosure level, second information IF2 indicating a new disclosure level and information about points given at the disclosure level, and buttons BT1 and BT2 for selecting the respective disclosure levels. Then, the presenter 245 presents such presentation information TJ1 on the user terminal 400 and causes a user to select either one of the buttons BT1 and BT2.

Figure 6B:
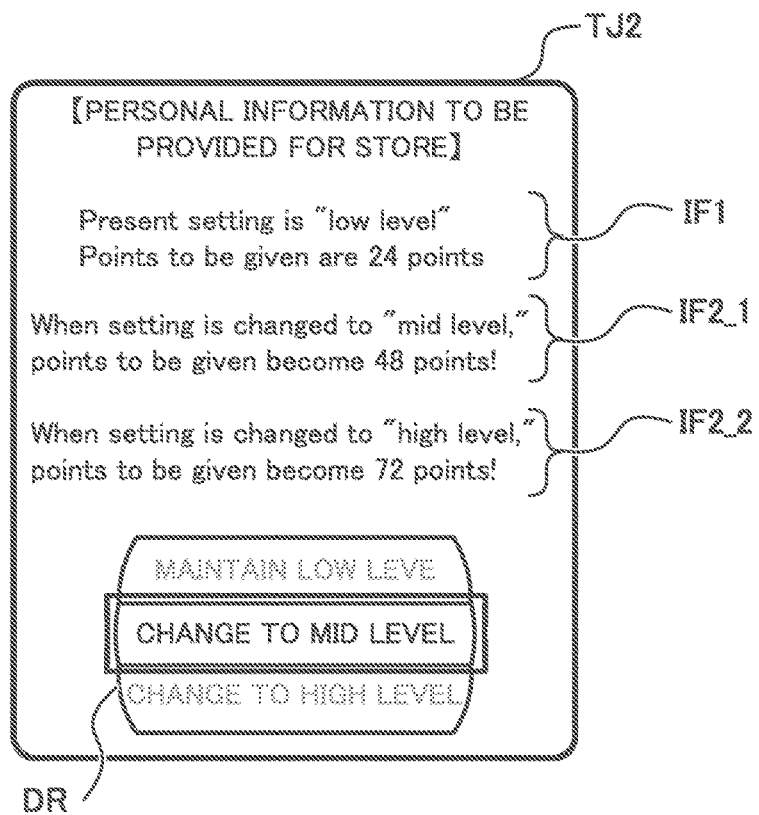

When the aforementioned picker 243 picks out two new disclosure levels, for example, the presenter 245 generates presentation information TJ2 as illustrated in FIG. 6B and presents the information on the user terminal 400. Specifically, the presenter 245 generates the presentation information TJ2 including first information IF1 indicating the present disclosure level and information about points given at the disclosure level, pieces of second information IF2_1 and IF2_2 each indicating a new disclosure level and information about points given at the disclosure level, and a drum roll DR for selecting each disclosure level. Then, the presenter 245 presents such presentation information TJ2 on the user terminal 400 and causes a user to select one level on the drum roll DR.

Further, while a case of including points to be given (bonuses) in the first information IF1 and the second information IF2 (IF2_1 and IF2_2) has been described in the examples in FIG. 6A and FIG. 6B, information about each disclosure level may only be presented, omitting such points.

Returning to FIG. 3, the giver 246 gives points (a first bonus) based on the present disclosure level (first level) or points (a second bonus) based on a new disclosure level (second level) to a payer, in accordance with a selection result in a user terminal 400 on which the first information and the second information are presented.

For example, when the button BT1 is selected in a situation that the presentation information TJ1 illustrated in FIG. 6A is presented on a user terminal 400, the giver 246 gives 24 points to a payer. On the other hand, when the button BT2 is selected, the giver 246 gives 48 points to the payer.

A case that even when the first information and the second information (the presentation information TJ1 or TJ2) are presented on a user terminal 400, a selection result is not acquired due to, for example, a user closing the payment application may occur. Therefore, when a predetermined time elapses without any selection in the situation that the first information and the second information are presented on a user terminal 400, the giver 246 gives points (a first bonus) based on the present disclosure level (first level) to a payer.

The provider 247 provides a store with partial information extracted from personal information according to the present disclosure level (first level) or a new disclosure level (second level), in accordance with a selection result in a user terminal 400 on which the first information and the second information are presented.

For example, the provider 247 provides a store with partial information extracted from each piece of information included in the personal information 232 illustrated in aforementioned FIG. 5, according to a disclosure level (a selected disclosure level).

As an example, when the "low level" is selected, the provider 247 extracts the date of birth 232c and the gender 232d and provides a store with the extracted items. Further, when the "mid level" is selected, the provider 247 extracts the date of birth 232c, the gender 232d, and part of the address 232e (for example, down to a prefecture, and a ward or a city) and provides the store with the extracted items. Further, when the "high level" is selected, the provider 247 extracts the name 232a, the date of birth 232c, the gender 232d, the address 232e, and the annual income 232f and provides the store with the extracted items.

As described above, a case that even when the first information and the second information (the presentation information TJ1 or TJ2) are presented on a user terminal 400, a selection result is not acquired due to, for example, a user closing the payment application may occur. Therefore, when a predetermined time elapses without any selection in a situation that the first information and the second information are presented on a user terminal 400, the provider 247 provides the store with partial information extracted from personal information according to the present disclosure level (first level).

When a selection result in a user terminal 400 on which the first information and the second information are presented is the second information, the updater 248 updates the disclosure level of a payer to a new disclosure level (second level).

For example, when the button BT2 is selected in a situation that the presentation information TJ1 illustrated in FIG. 6A is presented on a user terminal 400, the updater 248 updates the disclosure level 232g of a payer in the personal information 232 illustrated in aforementioned FIG. 5 to the "mid level."

In addition, when a user is instructed to make an inquiry about a settlement history by the payment application, for example, the controller 240 generates settlement history information in response to the inquiry.

The aforementioned CPU 501 or the like may function as the controller 240 with such a configuration.

Functional Configuration of User Terminal 400

Figure 7:
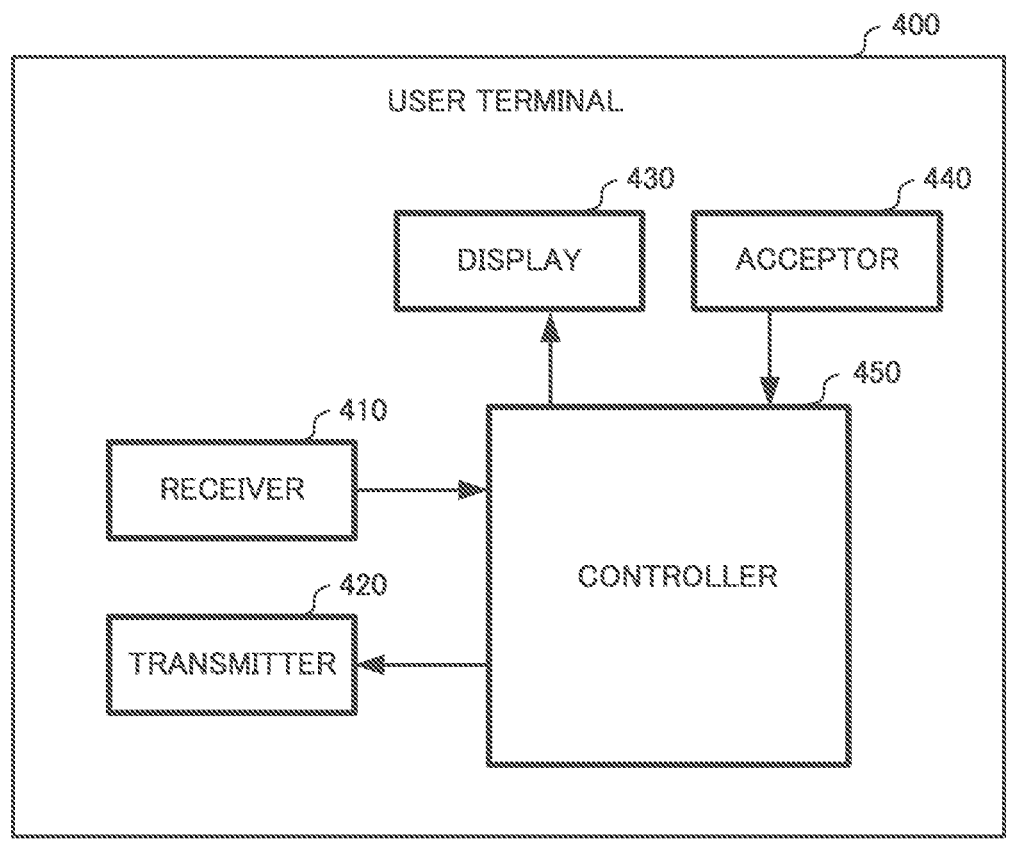
FIG. 7 is a block diagram illustrating an example of a functional configuration of the user terminal according to the present embodiment.

FIG. 7 is a block diagram illustrating an example of a functional configuration of the user terminal 400 according to the present embodiment. As illustrated, the user terminal 400 includes a receiver 410, a transmitter 420, a display 430, an acceptor 440, and a controller 450.

The receiver 410 receives information sent from the settlement server 200 and the like via the Internet 900.

For example, the receiver 410 receives presentation information and the like sent from the settlement server 200.

The aforementioned NIC 504 may function as such a receiver 410.

The transmitter 420 transmits information directed to the settlement server 200 and the like via the Internet 900.

For example, the transmitter 420 transmits selection information (a selection result) based on depression of a button or the like to the settlement server 200 in a situation that presentation information is sent from the settlement server 200 and is presented on the display 430. In addition, the transmitter 420 transmits request information for requesting an inquiry about a settlement history to the settlement server 200.

The aforementioned NIC 504 may function as such a transmitter 420.

The display 430 displays various types of information to be reported to a user.

Figure 8A:
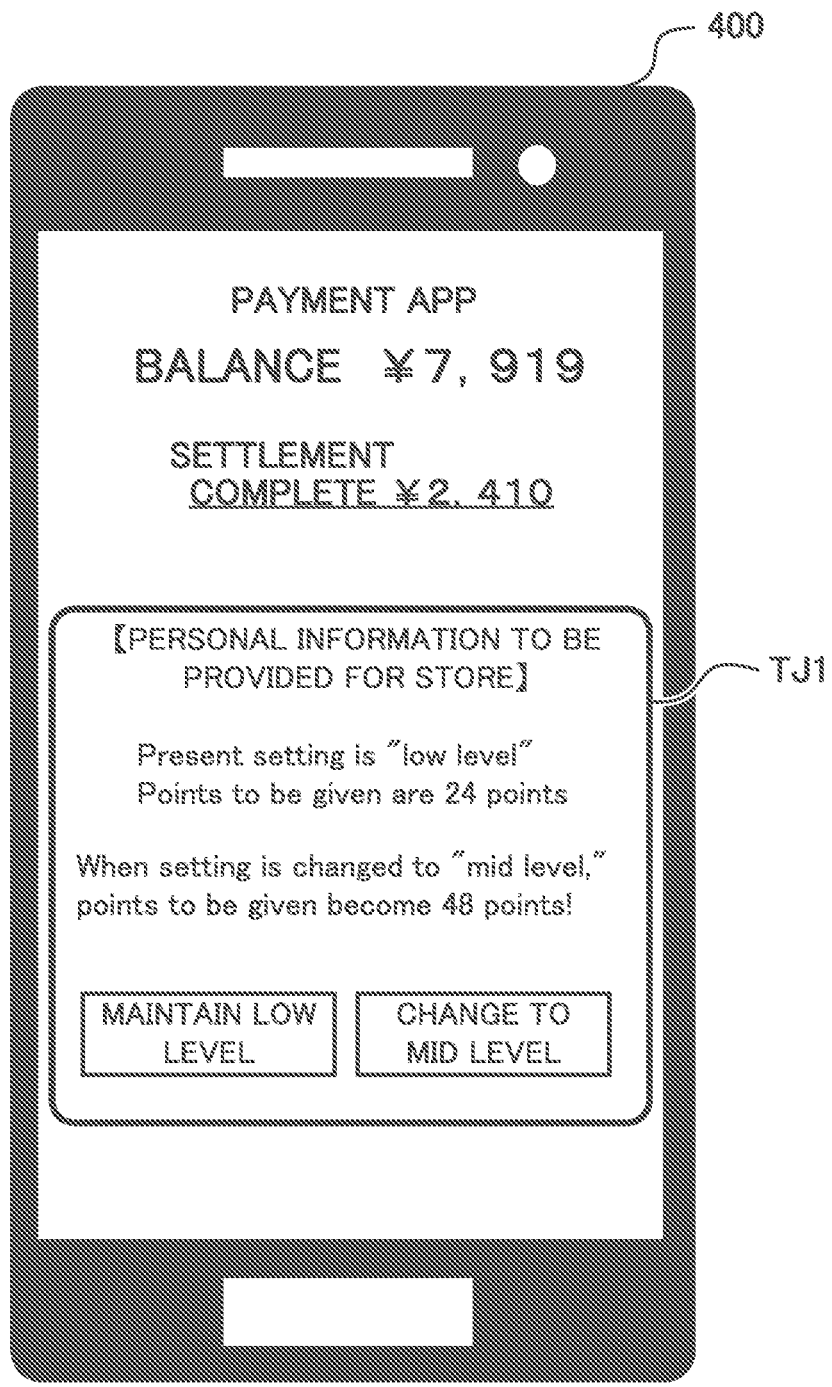
FIG. 8A and FIG. 8B are schematic diagrams illustrating an example of a settlement screen displayed on the user terminal.

For example, when the receiver 410 receives the presentation information TJ1 as illustrated in FIG. 6A, the display 430 displays a settlement screen (a screen indicating a settlement result) as illustrated in FIG. 8A including the presentation information TJ1.

Figure 8B:
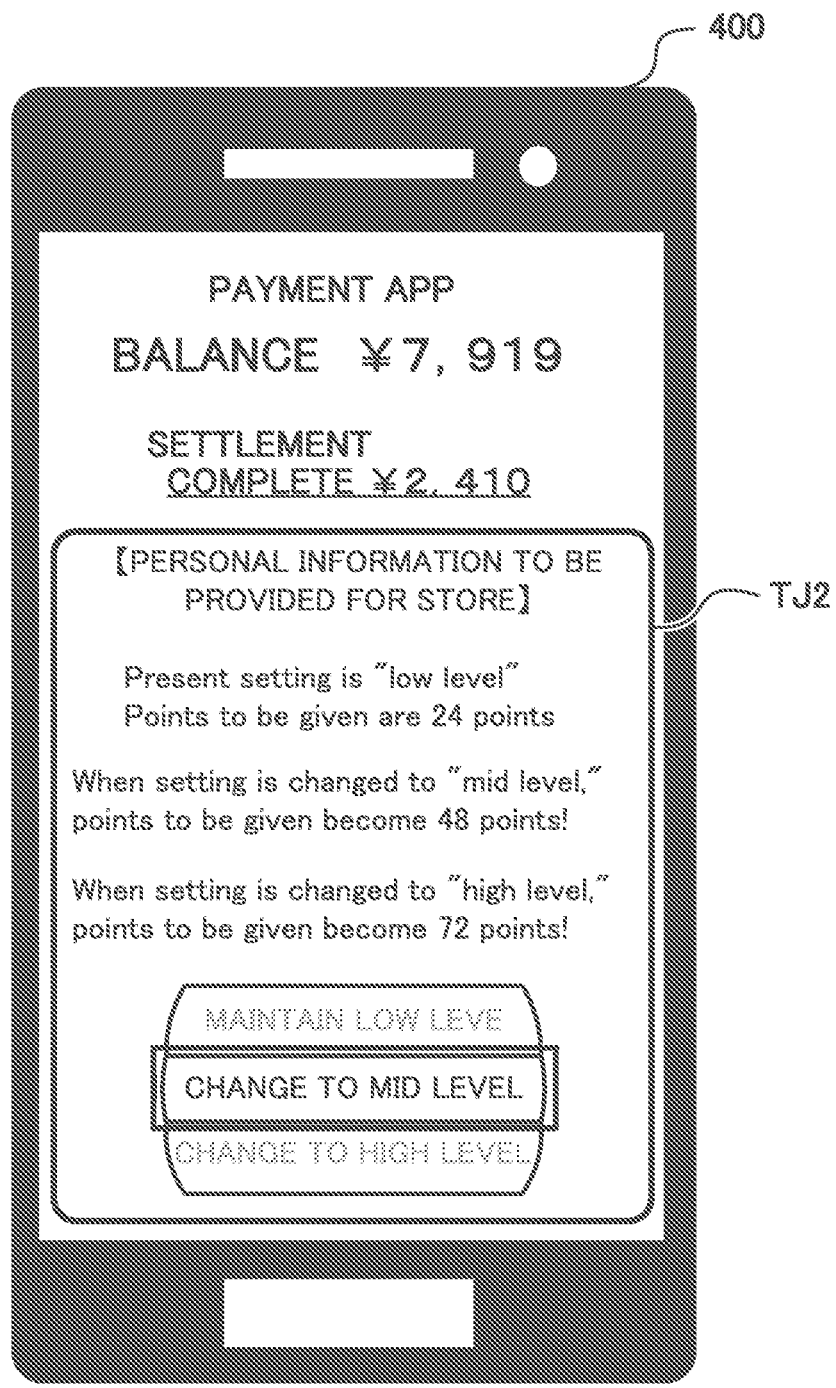

Further, when the receiver 410 receives the presentation information TJ2 as illustrated in FIG. 6B, the display 430 displays a settlement screen as illustrated in FIG. 8B including the presentation information TJ2.

The aforementioned display unit 510 may function as such a display 430.

Returning to FIG. 7, the acceptor 440 accepts operation from a user.

For example, the acceptor 440 is a touch panel superimposed on the display 430 and accepts operation (button operation or drum roll operation) on the presentation information TJ1 or TJ2 as illustrated in FIG. 8A and FIG. 8A.

The aforementioned operation unit 509 may function as such an acceptor 440.

The controller 450 controls the entire user terminal 400.

For example, when receiving presentation information sent from the settlement server 200 by the receiver 410, the controller 450 controls the display 430 in such a way as to cause the display 430 to display the presentation information TJ1 or TJ2 as illustrated in FIG. 8A and FIG. 8A. Then, when the presentation information TJ1 or TJ2 is touch operated by a user and the acceptor 440 accepts the operation, the controller 450 controls the transmitter 420 in such a way as to cause the transmitter 420 to transmit the selection result to the settlement server 200.

The aforementioned CPU 501 or the like may function as such a controller 450.

Operation of Settlement Server 200

Operation of the settlement server 200 in such a payment system 100 will be described below with reference to FIG. 9. FIG. 9 is a flowchart illustrating a flow of information provision processing executed by the settlement server 200.

For example, the information provision processing is started every time settlement information is sent from store equipment 300 to the settlement server 200 by a payer (a user making a payment at the store) making a payment using the payment application.

First, the settlement server 200 performs settlement processing in accordance with settlement information sent from the store equipment 300 (Step S11).

Specifically, when the receiver 210 receives the settlement information sent from the store equipment 300 via the Internet 900, the controller 240 (settlement processor 241) appropriately updates the settlement management information 231 stored in the storage 230, in accordance with the settlement information, and performs the settlement processing based on the payment by the payer.

The settlement server 200 acquires the present disclosure level set by the payer (Step S12).

Specifically, the controller 240 (acquirer 242) refers to the personal information 232 stored in the storage 230 and acquires the disclosure level 232g of the payer.

The settlement server 200 picks out a new disclosure level (Step S13).

Specifically, the controller 240 (picker 243) picks out a new disclosure level different from the present disclosure level. For example, based on information about the detected electronic settlement or a usage track record of the payer at the store, the controller 240 picks out a new disclosure level with a degree of disclosure higher than that of the present disclosure level or a degree of disclosure lower than that of the present disclosure level.

As an example, the controller 240 picks out a disclosure level with a degree of disclosure higher than that of the present disclosure level for a store having a past settlement track record of a certain frequency or more, or a certain amount or more. On the other hand, the controller 240 picks out a disclosure level with a degree of disclosure lower than that of the present disclosure level for a store having a past settlement track record of less than the certain frequency or less than the certain amount.

Further, the controller 240 may pick out a plurality of new disclosure levels different from the present disclosure level.

The settlement server 200 calculates points based on each disclosure level (Step S14).

Specifically, based on the present disclosure level, the new disclosure level, and information about the detected electronic settlement, the controller 240 (calculator 244) calculates points given at the present disclosure level and points given at the new disclosure level.

As an example, the controller 240 calculates points equivalent to 1% of the settlement amount when a disclosure level is the "low level," calculates points equivalent to 2% of the settlement amount when the disclosure level is the "mid level," and calculates points equivalent to 3% of the settlement amount when the disclosure level is the "high level."

The settlement server 200 presents the user terminal 400 with first information and second information each indicating information about a disclosure level and points (Step S15).

Specifically, the controller 240 (presenter 245) presents the first information indicating the present disclosure level and information about points to be given at the present disclosure level, and the second information indicating the new disclosure level and information about points to be given at the new disclosure level in a selectable manner at the user terminal 400.

For example, the controller 240 generates the presentation information TJ1 or TJ2 as illustrated in FIG. 6A and FIG. 6A and presents the information on the user terminal 400.

Specifically, the controller 240 generates the presentation information TJ1 or TJ2 including the first information IF1 indicating the present disclosure level and information about points given at the disclosure level, the second information IF2 (IF2_1 and IF2_2) indicating the new disclosure level and information about points given at the disclosure level, and the buttons BT1 and BT2 or the drum roll DR for selecting each disclosure level. Then, the presenter 245 presents the presentation information TJ1 or TJ2 on the user terminal 400 and causes the user to select the button BT1 or BT2, or one level on the drum roll DR.

The settlement server 200 determines whether the second information is selected (Step S16).

When determining that the second information is not selected (the first information is selected) (Step S16: No), the settlement server 200 gives points based on the present disclosure level to the user (Step S17). It is assumed that the settlement server 200 determines that the second information is not selected when a predetermined time elapses without selection of either type of information.

In other words, the controller 240 (giver 246) gives, to the payer, points to be given at the present disclosure level.

For example, when the button BT1 is selected in the situation that the presentation information TJ1 illustrated in FIG. 6A is presented on the user terminal 400, the controller 240 gives 24 points to the payer.

The settlement server 200 provides the store with partial information extracted from the personal information according to the present disclosure level (Step S18).

Specifically, the controller 240 (provider 247) provides the store with partial information extracted according to the present disclosure level (selected disclosure level) from various types of information included in the personal information 232 illustrated in FIG. 5.

For example, when the button BT1 is selected in the situation that the presentation information TJ1 illustrated in FIG. 6A is presented on the user terminal 400, the controller 240 extracts the date of birth 232c and the gender 232d from the personal information 232 and provides the store with the extracted items.

Then, the settlement server 200 ends the information provision processing.

On the other hand, when the second information is selected in aforementioned Step S16 (Step S16: Yes), the settlement server 200 gives points based on the new disclosure level to the user (Step S19).

Specifically, the controller 240 (giver 246) gives, to the payer, points to be given at the new disclosure level.

For example, when the button BT2 is selected in the situation that the presentation information TJ1 illustrated in FIG. 6A is presented on the user terminal 400, the controller 240 gives 48 points to the payer.

The settlement server 200 provides the store with partial information extracted from the personal information according to the new disclosure level (Step S20).

Specifically, the controller 240 (provider 247) provides the store with partial information extracted according to the new disclosure level (selected disclosure level) from various types of information included in the personal information 232 illustrated in FIG. 5.

For example, when the button BT2 is selected in the situation that the presentation information TJ1 illustrated in FIG. 6A is presented on the user terminal 400, the controller 240 extracts the date of birth 232c, the gender 232d, and part of the address 232e (for example, down to a prefecture, and a ward or a city) from the personal information 232 and provides the store with the extracted items.

The settlement server 200 updates the disclosure level of the payer to the new disclosure level (Step S21).

Specifically, the controller 240 (updater 248) updates the disclosure level 232g of the payer in the personal information 232 in the storage 230 to the new disclosure level.

For example, when the button BT2 is selected in the situation that the presentation information TJ1 illustrated in FIG. 6A is presented on the user terminal 400, the controller 240 updates the disclosure level 232g of the payer to the "mid level."

In such information provision processing, with presentation information displayed on a user terminal 400, a payer can check a degree of disclosure of personal information provided for a store and can freely change the degree of disclosure. At that time, the payer can change the degree of disclosure in consideration of points to be given and the like.

Consequently, the degree of disclosure of the personal information provided for the store can be freely changed.

Other Embodiments

While a case of the settlement server 200 transmitting presentation information to a user terminal 400 and the user terminal 400 presenting the presentation information on the settlement screen of the payment application has been described in the aforementioned embodiment, the presentation information may be presented on a screen different from the settlement screen (for example, in another application).

For example, the controller 240 (presenter 245) in the settlement server 200 may present presentation information to a user terminal 400 by a push notification, various short message services (SMS), or an electronic mail.

While a case of the settlement server 200 presenting presentation information to a user terminal 400 has been described in the aforementioned embodiment, a server device different from the settlement server 200 may present presentation information to a user terminal 400.

For example, the server device is configured by excluding the settlement processor 241 from the configuration of the settlement server 200 illustrated in FIG. 3 and when detecting an electronic settlement from a payer to a store, generates the presentation information TJ1 or TJ2 as illustrated in FIG. 6A and FIG. 6A, similarly to the settlement server 200, and presents the information to a user terminal 400. At that time, the server device may present the presentation information TJ1 or TJ2 to the user terminal 400 by a push notification, various SMS, or an electronic mail.

While a case of changing a degree of disclosure of personal information when making a payment at a real store has been described in the aforementioned embodiment, a degree of disclosure of personal information may be changed when a payment is made at a store on the Internet (virtual store).

For example, in a case of payment at a store on the Internet, a settlement may be finalized when a purchased commodity is shipped. In that case, the settlement server 200 or the like may present presentation information to a user terminal 400 by a push notification, various SMS, or an electronic mail.

As described above, the present disclosure can provide a payment system, a method for providing information, and a program that are able to freely change a degree of disclosure of personal information provided for a store.

REFERENCE SIGNS LIST

100 Payment system
200 Settlement server

210 Receiver
220 Transmitter
230 Storage
240 Controller
241 Settlement processor
242 Acquirer
243 Picker
244 Calculator
245 Presenter
246 Giver
247 Provider
248 Updater
300 Store equipment
400 User terminal
410 Receiver
420 Transmitter
430 Display
440 Acceptor
450 Controller
500 Information processing device
501 CPU
502 ROM
503 RAM
504 NIC
505 Image processor
506 Sound processor
507 Auxiliary storage
508 Interface
509 Operation unit
510 Display unit
900 Internet

The invention claimed is:

1. A payment system comprising:
a server detecting an electronic settlement from a payer to a store and a terminal used by the payer for the electronic settlement, the server configured as:
    an acquirer configured to acquire, when the electronic settlement is detected, a first level indicating a degree of disclosure of personal information, the degree of disclosure having being previously set by the payer;
    a picker configured to pick out a second level different from the first level, wherein the second level indicates a degree of disclosure of personal information different than that of the first level;
    a presenter configured to generate an interface for presentation on the terminal, the interface comprising first information including information indicating a value of a first bonus available to the payer at the first level, second information including information indicating a value of a second bonus available to the payer at the second level, and selectable interface elements configured to enable the payer to select one of the first level or second level, wherein the first bonus is different from the second bonus;
    a receiver configured to receive, from the terminal at which the generated interface was presented and in response to selection of one of the selectable interface elements by the payer, a selection result indicating a selection of either the first level or second level;
    a provider configured to provide the store with partial information extracted from the personal information according to the degree of disclosure of personal information associated with the selected level as indicated in the received selection result; and
    an updater configured to update a degree of disclosure of the personal information to the second level when the selection result indicates a selection of the second level.

2. The payment system according to claim 1, wherein the picker is configured to pick out the second level with a degree of disclosure higher than that of the first level or a degree of disclosure lower than that of the first level, based on information about the detected electronic settlement or a usage track record of the payer at the store.

3. The payment system according to claim 1, wherein the server further includes a calculator configured to calculate each of the first bonus to be given to the payer at the first level and the second bonus to be given to the payer at the second level, based on the first level, the second level, and information about the electronic settlement.

4. The payment system according to claim 3, wherein the server further includes a giver configured to give the first bonus or the second bonus to the payer in accordance with the selected level as indicated in the received selection result.

5. The payment system according to claim 4, wherein the giver is configured to give the first bonus to the payer when a predetermined time elapses without any selection at the terminal at which the first information and the second information are presented and the provider is configured to provide the store with partial information extracted from the personal information according to the degree of disclosure of personal information associated with the first level.

6. The payment system according to claim 1, wherein the terminal includes:
    a receiver configured to receive the generated interface sent from the server in conjunction with the electronic settlement;
    a display configured to display the generated interface received by the receiver;
    an acceptor configured to accept selection of either of the first level and the second level via the selectable interface elements in the displayed interface; and
    a transmitter configured to transmit the selection result in accordance with the selection accepted by the acceptor to the server.

7. A method for providing information executed by a server detecting an electronic settlement from a payer to a store, the method comprising:
    detecting, by the server, the electronic settlement from the payer to the store;
    acquiring, by the server and at least in part in response to detecting the electronic settlement, a first level indicating a degree of disclosure of personal information, the degree of disclosure having being previously set by the payer;
    picking out, by the server, a second level different from the acquired first level, wherein the second level indicates a degree of disclosure of personal information different than that of the first level;
    generating, by the server, an interface for presentation on a terminal used by the payer for the electronic settlement, the interface comprising first information including information indicating a value of a first bonus available to the payer at the first level, second information including information indicating a value of a second bonus available to the payer at the second level, and selectable interface elements configured to enable the payer to select one of the first level or second level, wherein the first bonus is different from the second bonus;

receiving, by the server and from the terminal at which the generated interface was presented in response to selection of one of the selectable interface elements by the payer, a selection result indicating a selection of either the first level or second level;

providing, by the server, the store with partial information extracted from the personal information according to the degree of disclosure of personal information associated with the selected level as indicated in the received selection result; and determining, by the server, that the selection result indicates a selection of the second level;

updating, by the server and at least in part in response to determining that the selection result indicates a selection of the second level, a degree of disclosure of the personal information to the second level.

8. A non-transitory computer-readable recording medium having a computer-executable program stored thereon that, when executed by a computer detecting an electronic settlement from a payer to a store, the program causes the computer to:

acquire, when the electronic settlement is detected, a first level indicating a degree of disclosure of personal information, the degree of disclosure having being previously set by the payer;

pick out a second level different from the first level, wherein the second level indicates a degree of disclosure of personal information different than that of the first level;

generate an interface for presentation on a terminal used by the payer for the electronic settlement, the interface comprising first information including information indicating a value of a first bonus available to the payer at the first level, second information including information indicating a value of a second bonus available to the payer at the second level, and selectable interface elements configured to enable the payer to select one of the first level or second level, wherein the first bonus is different from the second bonus;

receive, from the terminal at which the generated interface was presented and in response to selection of one of the selectable interface elements by the payer, a selection result indicating a selection of either the first level or second level;

provide the store with partial information extracted from the personal information according to the degree of disclosure of personal information associated with the selected level as indicated in the received selection result; and update a degree of disclosure of the personal information to the second level when the selection result indicates a selection of the second level.

\* \* \* \* \*